F. LJUNGSTRÖM.
DASHPOT.
APPLICATION FILED OCT. 14, 1920.
1,386,879.
Patented Aug. 9, 1921.
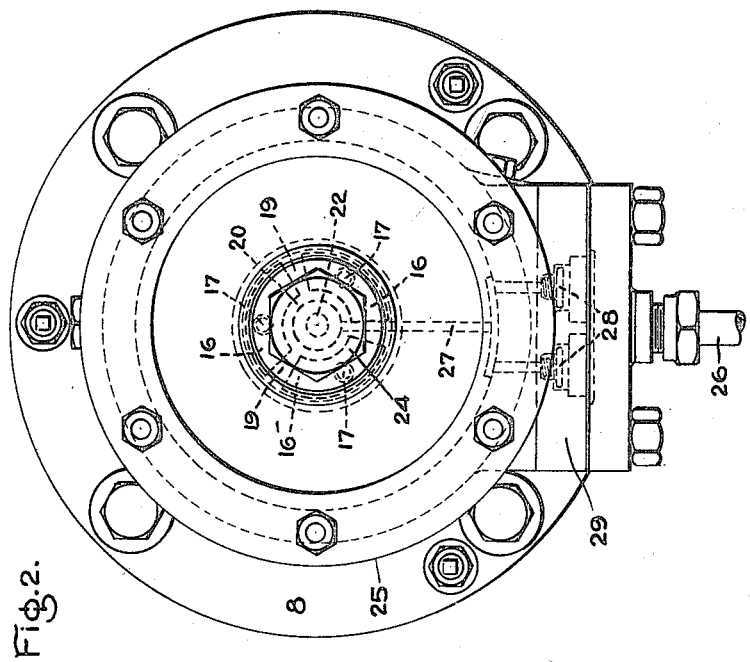
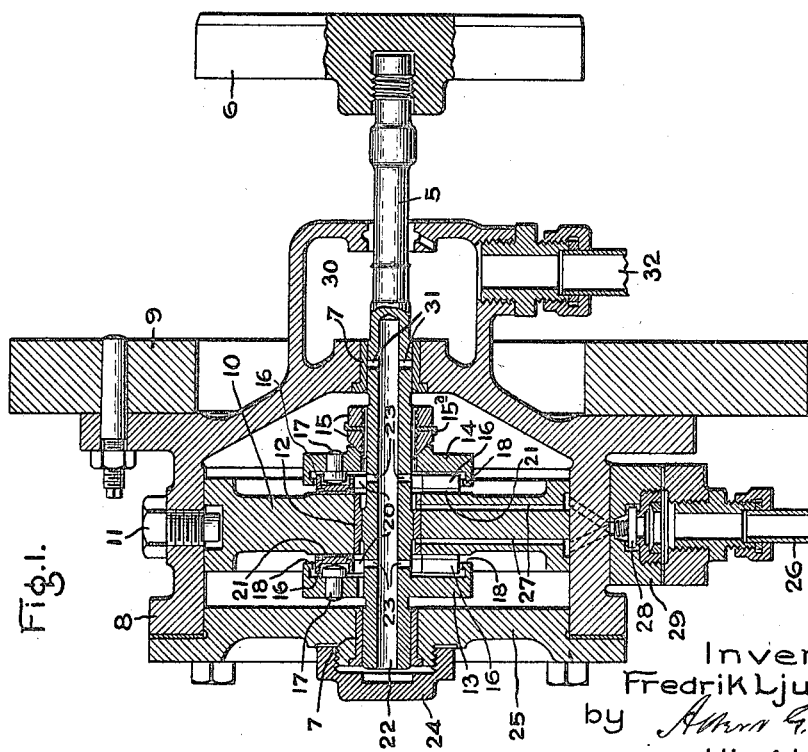
Inventor:
Fredrik Ljungström,
by
His Attorney.

UNITED STATES PATENT OFFICE.

FREDRIK LJUNGSTRÖM, OF BREVIK, LIDINGÖN, SWEDEN, ASSIGNOR TO AKTIE-BOLAGET LJUNGSTROMS ANGTURBIN, OF SKÄRSÄTRA, SWEDEN.

DASHPOT.

1,386,879. Specification of Letters Patent. Patented Aug. 9, 1921.

Application filed October 14, 1920. Serial No. 416,944.

*To all whom it may concern:*

Be it known that I, FREDRIK LJUNGSTRÖM, a subject of the King of Sweden, residing at Brevik, Lidingön, Sweden, have invented certain new and useful Improvements in Dashpots, of which the following is a specification.

The present invention relates to dashpots intended for use in reducing or dampening axial vibrations of a rotor member which has a limited amount of axial play. One application of my invention is in connection with elastic fluid turbines for reducing axial vibrations of a rotor or rotors thereof, and it is particularly intended for use with radial flow turbines having oppositely rotating wheels in which the axial thrust is balanced by means of pressure disks upon which elastic fluid acts, the pressure increasing and decreasing on such disks when the wheels move axially, thereby maintaining such wheels in correct position.

My invention relates particularly to dashpots of the type comprising a cylinder filled with a liquid such as oil, and a piston, the cylinder and piston being axially movable relatively to each other, and the cylinder spaces on opposite sides of the piston being connected by a passage of restricted area, the arrangement being such that while it permits of slow relative axial movement, it dampens out and prevents quick vibratory movements.

In such dash-pots, particularly where oil is used as the liquid, it is important that all air be separated from the liquid since the presence of air in the liquid renders the liquid more or less elastic which is obviously detrimental to the efficient operation of the dash-pot.

The object of my invention is to provide an improved dashpot of the above referred to character which among other features embodies an arrangement whereby air is efficiently separated from the liquid as the liquid enters the dash-pot, and for a consideration of what I believe to be novel and my invention, attention is directed to the accompanying description and the claims appended thereto.

In the drawing Figure 1 is an axial, sectional view of a dash-pot embodying my invention; and Fig. 2 is an end view thereof.

Referring to the drawing, 5 indicates a shaft having a coupling flange 6 by means of which it may be coupled to a rotating shaft such as the shaft of an elastic fluid turbine. Shaft 5 is journaled in bearings 7 in a cylindrical casing 8, which casing is bolted to a suitable support 9 and forms the cylinder of a dash-pot. In casing 8 is a piston 10 which may move axially therein, but is held from rotation by means of a bolt 11 which passes through casing 8 and enters a recess in the periphery of piston 10, which recess is of such length as to permit of the desired amount of axial movement of shaft 5. Shaft 5 passes freely through an opening in the center of piston 10, there being a bearing lining 12 in such opening on which the shaft runs.

Carried by shaft 5 in casing 8 and located on opposite sides of piston 10 are two pressure disk 13 and 14, the disk 13 being formed integral with shaft 5 and the disk 14 being suitably keyed or otherwise fastened to shaft 5 so as to turn therewith. Disk 14 may be adjusted axially along shaft 5 and is held from axial movement by nuts 15 which are locked against turning by a locking washer 15ª. Between each pressure disk and the adjacent surface of piston 10 are arranged a number of ring segments 16 which are held by studs 17 projecting from disks 13 and 14. In the present instance three ring segments are shown on each disk and each is held by a single stud 17, the segments being prevented from turning on the studs by flanges 18 at the peripheries of the pressure disks. Ring segments 16 are spaced apart circumferentially so as to leave radially extending passages 19 between them, which communicate at their inner ends with annular chambers 20. The surfaces of ring segments 16 which bear against piston 10 are provided with bearing linings 21 and the segments may be brought into firm engagement with the piston by screwing up nuts 15. Shaft 5 is provided with an axially extending opening 22 which is connected by holes 23 with chambers 20. The cylinder chambers on opposite sides of piston 10 are thus connected to each other by way of holes 23 and opening 22. The outer end of shaft opening 22 is closed by a cap 24 which threads over a boss on cylinder head 25.

Cylindrical casing 8 is normally filled with a liquid such as oil and is kept filled through a supply pipe 26 which feeds liquid through channels 27 in piston 10 to chambers 20. Reverse flow of liquid through channels 27 is prevented by spring pressed check valves 28 located in a valve box 29.

On the inner cylinder head of casing 8 is a wall forming a chamber 30 which communicates with opening 22 in shaft 5 through holes 31 and the space between shaft 5 and the bearing. Connected to chamber 30 is a drain pipe 32.

In operation shaft 5 rotates as do also the pressure disks 13 and 14 and ring segments 16. Piston 10, however, remains stationary, ring segments 16 rotating on it. An axial displacement of shaft 5 requires an axial movement of piston 10 in the same direction and since the cylinder 8 is entirely filled with liquid, this can only take place by the transfer of such liquid from one side of piston 10 to the other through holes 23 and opening 22. Holes 23 are of limited area so that any quick movements of the piston are prevented by the liquid, because it will not have time to pass through holes 23. Any vibrations are thus wholly or partially prevented or damped out. However, a gradual, limited axial movement of the piston in the cylinder is permitted within the limits of bolts 11.

Liquid is being continuously forced into cylinder 8 through supply pipe 26 to make up the deficiency caused by leakage of liquid from the cylinder, and it is important that all air be separated from this liquid since the presence of any air in the liquid has an injurious influence on its consistency rendering it more or less elastic. By my improved structure and arrangement of dash-pot, I effectively separate air from the liquid in the following manner,—

The liquid entering through channels 27 is fed into annular chambers 20 from whence it is forced radially outward through the passages 19 between ring segments 16, the action being in the nature of a pumping operation. This pumping action must take place against the pressure of the liquid filling cylinder 8 and as a result the heavier liquid is thrown radially outward while any air together with excess of liquid will be forced through or flow through holes 23 into opening 22 from whence it will escape through holes 31 and the bearing 7 to chamber 30 from which it is discharged by pipe 32.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In an apparatus of the character described, the combination of a cylinder, a shaft journaled in walls of the cylinder, an axially movable non-rotatable piston in the cylinder, members carried by the shaft and engaging the piston on opposite sides, means for supplying liquid to the cylinder, and means carried by said members for separating air from such liquid.

2. In an apparatus of the character described, the combination of a cylinder, a shaft journaled in walls of the cylinder, an axially movable non-rotatable piston in the cylinder, said shaft passing through an opening in the center of the piston, pressure members carried by the shaft and engaging the piston on opposite sides, means for supplying liquid to the cylinder at a point adjacent said shaft, said means including a radial passage in said piston, and means carried by said pressure members for separating air from such liquid.

3. In an apparatus of the character described, the combination of a cylinder, an axially movable non-rotatable piston therein, a shaft journaled in walls of the cylinder, said shaft passing through an opening in the center of the piston, pressure members carried by the shaft and engaging the piston on opposite sides, means for supplying liquid to the cylinder at a point adjacent said shaft, said means including a radial passage in said piston, and means carried by said pressure members for separating air from said liquid, said shaft being provided with passages for conveying air outside the cylinder.

4. In an apparatus of the character described, the combination of a cylinder, a shaft journaled in walls of the cylinder, an axially movable non-rotatable piston in the cylinder, said shaft passing through an opening in the center of the piston, and being provided with passages of restricted area which connect the cylinder spaces on opposite sides of the piston, pressure disks carried by the shaft on opposite sides of the piston, ring segments on said pressure disks which engage said piston, and means for supplying liquid to the cylinder at points adjacent the central portion of said pressure disks, said ring segments serving to separate air from the liquid supplied by centrifugal action on such liquid.

5. In an apparatus of the character described, the combination of a cylinder, a shaft journaled in walls of the cylinder, an axially movable non-rotatable piston in the cylinder, said shaft passing through an opening in the center of the piston, and being provided with a passage of restricted area which connects the cylinder spaces on opposite sides of the piston, pressure disks carried by the shaft on opposite sides of the piston, ring segments on said pressure disks which engage said piston and means for supplying liquid to the cylinder at points adjacent the central portions of said pressure disks, said ring segments serving to separate air from the liquid supplied by centrifugal action on such liquid, and said shaft being provided with passages for the escape of such air.

In witness whereof, I have hereunto set my hand this 12th day of September, 1920.

FREDRIK LJUNGSTRÖM.